J. COURTLEYOW.
Machine for Setting and Cooling Tires.
No. 82,605.
Patented Sept. 29, 1868.
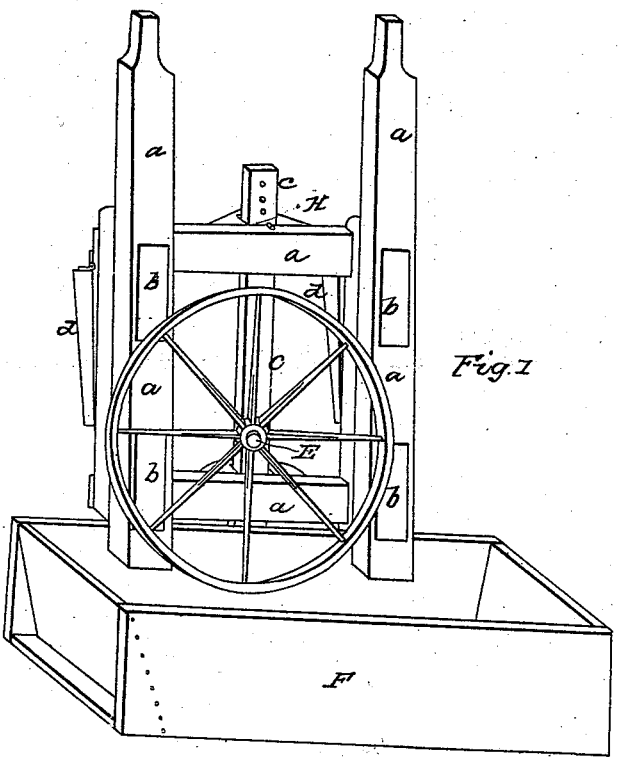
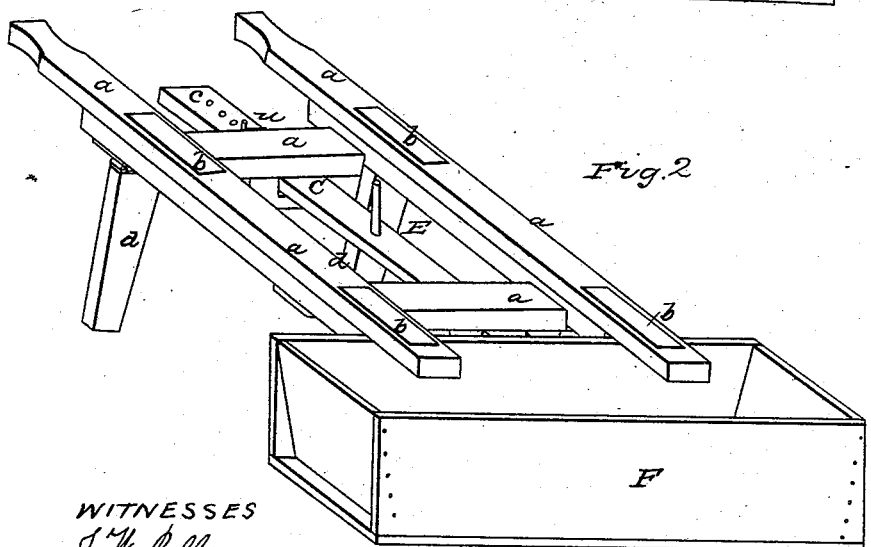

United States Patent Office.

JACOB COURTLEYOW, OF CHARITON, IOWA.

Letters Patent No. 82,605, dated September 29, 1868.

IMPROVEMENT IN MACHINE FOR SETTING AND COOLING TIRE.

*The Schedule referred to in these Letters Patent and making part of the same.*

TO ALL WHOM IT MAY CONCERN:

Be it known that I, JACOB COURTLEYOW, of Chariton, in the county of Lucas, and State of Iowa, have invented a new and improved Machine for Handling Wheels while Setting and Cooling Tire; and I do hereby declare the following is a full and exact description thereof, reference being had to the accompanying drawings, and to the letters of reference marked thereon.

The nature of my invention consists in constructing a substantial bench out of suitable material for that purpose, and attached by hinges to a trough, constructed so as to retain water for cooling tire after being properly adjusted to the wheel.

To enable others skilled in the art to make and use my invention, I will proceed to describe its construction and operation.

I construct the bench $a\ a\ a\ a$ of wooden material, of the proper dimensions, by mortising it together in such a manner as to form a stout and sufficient bench, to which are attached two legs $d\ d$, which are connected by hinges for a support while in a horizontal position, and on which the wheel is placed while adjusting the tire.

The bench is attached to the trough F with hinges, in such a manner that it can be raised to a perpendicular position, that the wheel which is supported on the axis E, may be placed in the trough containing water for cooling. By the slide C, the axis can be raised or lowered to suit any-sized wheel.

*Claim.*

What I claim, and desire to secure by Letters Patent, is—

The bench $a\ a\ a\ a$ attached to the trough F, together with the slide and axis, constructed, arranged, and operated as above described, for the purpose of setting and cooling tire, for the purpose and in the manner set forth.

JACOB COURTLEYOW.

Witnesses:
JAMES RUGG,
J. R. FIRE.